(12) United States Patent
Schmadel et al.

(10) Patent No.: US 7,933,482 B2
(45) Date of Patent: Apr. 26, 2011

(54) OPTICAL FIBER PROBE TIPS AND METHODS FOR FABRICATING SAME

(75) Inventors: Donald C. Schmadel, College Park, MD (US); Howard Dennis Drew, Hyattsville, MD (US); Vivekananda Adiga, Karnataka (IN); Max Anton Cubillos-Moraga, Columbia, MD (US)

(73) Assignee: University of Maryland, College Park, College Park, MD (US)

( * ) Notice: Subject to any disclaimer, the term of this patent is extended or adjusted under 35 U.S.C. 154(b) by 465 days.

(21) Appl. No.: 11/912,225

(22) PCT Filed: Apr. 27, 2006

(86) PCT No.: PCT/US2006/016433
§ 371 (c)(1),
(2), (4) Date: Sep. 19, 2008

(87) PCT Pub. No.: WO2006/116738
PCT Pub. Date: Nov. 2, 2006

(65) Prior Publication Data
US 2009/0022456 A1 Jan. 22, 2009

Related U.S. Application Data

(60) Provisional application No. 60/675,314, filed on Apr. 27, 2005.

(51) Int. Cl.
*G02B 6/02* (2006.01)
(52) U.S. Cl. ........ 385/123; 385/124; 385/125; 385/126; 385/127

(58) Field of Classification Search .................. 385/123, 385/124, 125, 126, 127
See application file for complete search history.

(56) References Cited

U.S. PATENT DOCUMENTS

| | | | |
|---|---|---|---|
| 6,103,535 A | 8/2000 | Pilevar et al. | |
| 6,236,783 B1 * | 5/2001 | Mononobe et al. | 385/43 |
| 6,280,647 B1 | 8/2001 | Muramatsu et al. | |
| 6,558,958 B1 | 5/2003 | Pilevar et al. | |
| 6,633,711 B1 | 10/2003 | Pilevar et al. | |
| 6,768,556 B1 * | 7/2004 | Matsumoto et al. | 356/601 |
| 2004/0126073 A1 | 7/2004 | Chiba et al. | |
| 2005/0123245 A1 | 6/2005 | Hatakoshi | |

FOREIGN PATENT DOCUMENTS

EP 0 763 742 3/1997
WO WO 96/12206 4/1996

OTHER PUBLICATIONS

PCT International Search Report for PCT/US2006/016433 dated Aug. 22, 2006.

* cited by examiner

*Primary Examiner* — Jennifer Doan
(74) *Attorney, Agent, or Firm* — Carter, DeLuca, Farrell & Schmidt, LLP

(57) ABSTRACT

Optical fiber probe tips and methods for fabricating the same are presented. One method entails immersing a distal end of an optical fiber having a cladding and a core into an etching solution and simultaneously etching the cladding and the core using the etching solution for tapering the cladding and the core to form a tapered cladding and a tapered core tip. The optical fiber probe tips are suitable for near-field, scanning, optical microscopy (NSOM).

23 Claims, 9 Drawing Sheets

OPTICAL FIBER PROBE TIPS AND METHODS FOR FABRICATING SAME

PRIORITY

This application claims the benefit of U.S. Provisional Application No. 60/675,314 filed on Apr. 27, 2005; the entire contents of which are incorporated herein by reference.

STATEMENT REGARDING FEDERALLY SPONSORED RESEARCH OR DEVELOPMENT

This invention was made with government support under Contract Number MDA90403C0464 awarded by the National Security Agency. The government has certain rights in the invention.

BACKGROUND

1. Technical Field

The present disclosure relates to the field of optical probes for use in near-field scanning optical microscopy (NSOM), also commonly referred to as scanning near-field optical microscopy (SNOM).

2. Description of the Prior Art

Near-field optical microscopy (NSOM) forms an image of a specimen by scanning an aperture over specimen or object. Utilizing a sub-wavelength aperture, which is an aperture smaller than the wavelength of light used to form the image, allows spatial resolution surpassing the diffraction limit. The aperture, an important determinative component of NSOM, has usually been formed on the end of an optical fiber which had been tapered by mechanical pulling or by chemical etching and then coated with aluminum as described in "Near-Field Nano/Atom Optics and Technology," edited by M. Ohtsu, and published by Springer-Verlag, 2002. In the prior art, mechanical pulling, as described by G. A. Valaskovic in "Parameter control, characterization, and optimization in the fabrication of optical fiber near-field probes," Appl. Opt., vol. 34, pages 1215-1228 (1995), involves first heating a small portion the fiber with, for example, a $CO_2$ laser beam and then rapidly pulling along the axis of the fiber causing the heated region to taper and eventually separate so as to form one or two fibers with tapered ends. This approach suffers from very high attenuation of the optical power traveling within the tip, which limits the utility of NSOM in experiments such as near-field Raman Spectroscopy, single molecule fluorescence, etc.

Chemical etching fabrication methods require one or more mechanisms to cause the cladding and core to etch at different rates. Shuji Mononobe and Motoichi Ohtsu describe such methods in their publication, "Fabrication of it Pencil-Shaped Fiber Probe for Near-Field Optics by Selective Chemical Etching," Journal of Lightwave Technology, vol. 14, no. 10, October 1996. The mechanisms may be grouped into two categories: meniscus etching and selective etching. As described in Mononobe et al, meniscus etching uses an oil layer floating on the top of the etching mixture with the interface forming a meniscus around the fiber. The height of the meniscus drops as the fiber cladding diameter decreases during the etching process. P. Hoffmann, B. Dutoit, and R. P. Salath describe tips formed using this mechanism in their publication entitled "Comparison of mechanically drawn and protection layer chemically etched optical fiber tips," Ultramicroscopy, vol. 61, pages 165-170 (1995). The surfaces of these tips produced by this method frequently show scalping and other defects caused of the unstable balance between gravity, surface tension and van der Waals forces involved in chemical wetting of the fiber surface. Further, the apex of the resulting tips may not be well centered within the core again because of this instability.

Selective etching relies on the fact that fibers with cores doped, for example, with germanium, placed into an etching solution of, for example, a buffered hydrofluoric acid solution with a volume ratio of [ammonium fluoride solution (40 wt %)]: [hydrofluoric acid solution (50 wt %)]: [water]=[X]:[1]:[1] respectively where X is the variable, the core etches faster than the cladding for X<1.7 and the cladding etches faster than the core for X>1.7 up to about X=30. The simplest implementation of selective etching places an optical fiber directly into an etching solution with X=30. Over time, the cladding etches back and away from the core slowly exposing the sides of the core to the etching solution. The result is a conical tip protruding from the end of the fiber. The remaining cladding forms a comparatively large shoulder which interferes with light propagation in reflective NSOM configurations. The advantage of selective etching is the automatic centering of the tip with respect to the core and the smooth surface of the tip.

These two mechanisms may be applied in various ways to produce an NSOM tip with a both a tapered core tip and cladding. Mononobe et al. produced tips using a four step process. The obvious disadvantages of a multi-step process are additional processing costs and the increased opportunity for damage to the tips in process.

After etching the tapered tips are usually coated with aluminum which retains the traveling radiation within the fiber. The details of metalizing NSOM tips are well described in the prior art, for example, by Saeed Pilevar, Klaus Edinger, Walid Atia, Igor Smolyaninov, and Christopher Davis in their publication "Focused ion-beam fabrication of fiber probes with well-defined apertures for use in near-field scanning optical microscopy," Appl. Phys. Lett., vol. 72, page 3133 (1998) and by T. Saiki, S. Mononobe, M. Ohtsu, N. Saito, and J. Kusano in their paper entitled "Tailoring a high-transmission fiber probe for photon scanning tunneling microscope," Appl. Phys. Lett., vol. 68, page 19, (1996). After the coating process, it may be necessary to remove some aluminum from the very tip of the coated region. This may be performed using a focused ion beam also as described by Saeed Pilevar et al.

Another critical consideration of NSOM imaging is the polarization of the illumination, which, among its other effects, is one of the factors which influence the optical contrast as described by E. B. McDaniel and J. W. P. Hsu in "Nanometer scale optical studies of twin domains and defects in lanthanum aluminate crystals," J. Appl. Phys., vol. 80, pages 1085-1093 (1996); by E. Betzig, J. K. Trautman, J. S. Weiner, T. D. Harris, and R. Wolfe in "Polarization contrast in near-field scanning optical microscopy," Appl. Opt., vol. 31, pages 4563-4568 (1992); and by J. A. Cline and M. Isaacson in "Probe-sample interactions in reflection near-field scanning optical microscopy," Appl. Opt., vol. 3, pages 4869-4876 (1995).

In a conventional circular core optical fiber, it is very difficult to control the polarization, which changes in response to stress and temperature induced geometrical non-uniformities in the core-clad geometry. T. Mitsui and T. Sekiguchi describe tips produced from stress-induced birefringent fibers mechanical pulling in their publication, "Observation of polarization property in near-field optical imaging by a polarization-maintaining fiber probe," Journal of Electron Microscopy, vol. 53, no. 2, pages 209-215 (2004).

Additional results may be found in T. Mitsui, "Development of a polarization-preserving optical-fiber probe for near-field scanning optical microscopy and the influences of bending and squeezing on the polarization properties," Rev. Sci. Instrum., vol. 76, pages 043703-1-043703-6 (2005). The resulting tips have very low throughput, which limits the utility of NSOM in experiments such as Near-field Raman Spectroscopy, single molecule fluorescence, etc.

SUMMARY

An aspect of the present disclosure is to provide methods for making optical fiber probe tips suitable for use with near-field, scanning, optical microscopy (NSOM). The methods include a combination of meniscus etching and selective etching combined into one or more steps. The combination of meniscus and selective etching causes the core tip to be formed by the dynamics of selective etching while the cladding is simultaneously tapered by meniscus etching.

An exemplary embodiment of the present disclosure includes the use of elliptical core single-mode fiber such as E Core™ PM fiber available from KVH Industries, Inc. of Middletown, R.I., USA. Probes developed from this fiber in accordance with methods described herein have unique optical transmission properties such as polarization dependent throughput, good polarization maintenance, and very high throughput.

An exemplary method disclosed herein also includes heating the fiber prior to etching to diffuse doping non-uniformities. Such an artifact is present in the E Core™ PM fiber as a thin low doped filament of silica within the core and running parallel to the fiber axis. This filament has a lower germanium doping than the surrounding region of the core and therefore etches faster. This results in a crater being formed on the end of the core tip after etching. Heating the fiber prior to etching diffuses this filament and eliminates the formation of the crater.

In particular, a method is provided for fabricating an optical fiber probe tip, where the method includes immersing a distal end of an optical fiber having a cladding and a core into an etching solution; and simultaneously etching the cladding and the core using the etching solution for tapering the cladding and the core to form a tapered cladding and a tapered core tip. The method further includes coating the tapered cladding and tapered core tip with a coating, and removing the coating from the tapered core tip by an ion beam to form a near-field, optical scanning microscopy aperture. For an elliptical optical fiber, the aperture is an elliptical aperture and the tapered core tip has an elliptical cross-section.

A top surface of the etching solution forms an interface with a material. The method further includes securing the optical fiber to a vertically translating assembly in operative communication with a micrometer adjuster assembly for vertically translating the optical fiber during the immersing step. The immersing step includes actuating the micrometer adjuster assembly for vertically translating the optical fiber in a first vertical direction for immersing the distal end of the optical fiber into the material.

The immersion of the optical fiber into the material continues for enabling the distal end of the optical fiber to contact the interface, such that the etching solution forms a meniscus enveloping the distal end of the optical fiber. The method then includes translating the optical fiber in a second vertical direction, opposite the first vertical direction, for creating a shoulder between the tapered cladding and the tapered core tip. The diameter of the shoulder depends on the distance between a top surface of the etching solution and the distal end of the optical fiber.

Further, an optical fiber probe tip is provided having a tapered cladding and a tapered core tip fabricated by immersing a distal end of an optical fiber having a cladding and a core into an etching solution and simultaneously etching the cladding and the core using the etching solution for tapering the cladding and the core to form the tapered cladding and the tapered core tip.

DETAILED DESCRIPTION

Figure 1:
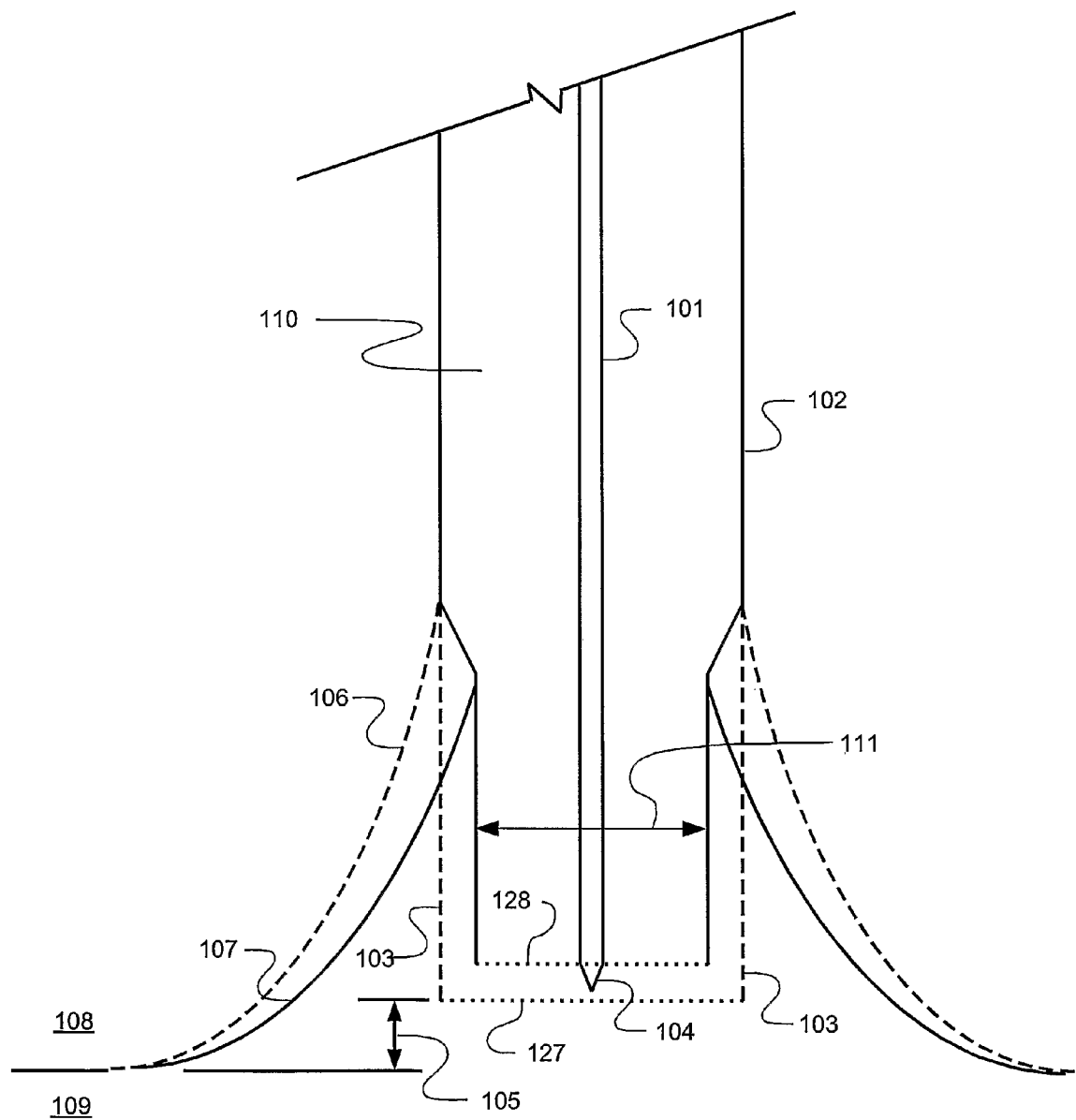
FIG. 1 is a schematic illustration of the initial period of etching of an optical fiber to produce a near-field, scanning, optical microscope probe tip in accordance with the present disclosure.

A process in accordance with an exemplary embodiment of the present disclosure is shown in FIG. 1 in which the distal end of an optical fiber, designated 110, which may be, for example, part number SM600 available from Thorlabs, Inc. of Newton, N.J., USA, is immersed a particular height 105 in an etching solution 109. The etching solution can be, for example, 30:1 buffered oxide etch (BOE) available from Mallinckrodt Baker, Inc. of Phillipsburg, N.J., USA. The optical fiber 110 consists of a glass core 101 and cladding 102. If the fiber 110 is supplied with a plastic jacket or other covering which could interfere with the etching process, the plastic jacket is removed from the region to be etched. The material generally designated 108 and located above the etching solution may be air. In one embodiment, material 108 is an inert layer of, for example, isooctane, which prevents evaporation of the etching solution and protects the upper portion of the fiber 110 from damage from BOE vapors.

As the etching process proceeds, the initial outside cladding surface, shown as dashed lines 103, decreases to the size shown by reference numeral 111. Concomitantly, the interface between the etching solution 109 and material 108, which forms a meniscus designated generally as 106, moves toward the center of the fiber to the position depicted by the line designated 107. The initial surface of the distal end of the fiber 110 is depicted as a dotted line 127. Simultaneous with the etching of the cladding 102 as described above, the core 101, which etches at a slower rate than the etching rate of the cladding 102, becomes a tapered core tip, as shown by reference numeral 104, which protrudes from the etched end of the fiber 110 designated by reference numeral 128.

Figure 2:
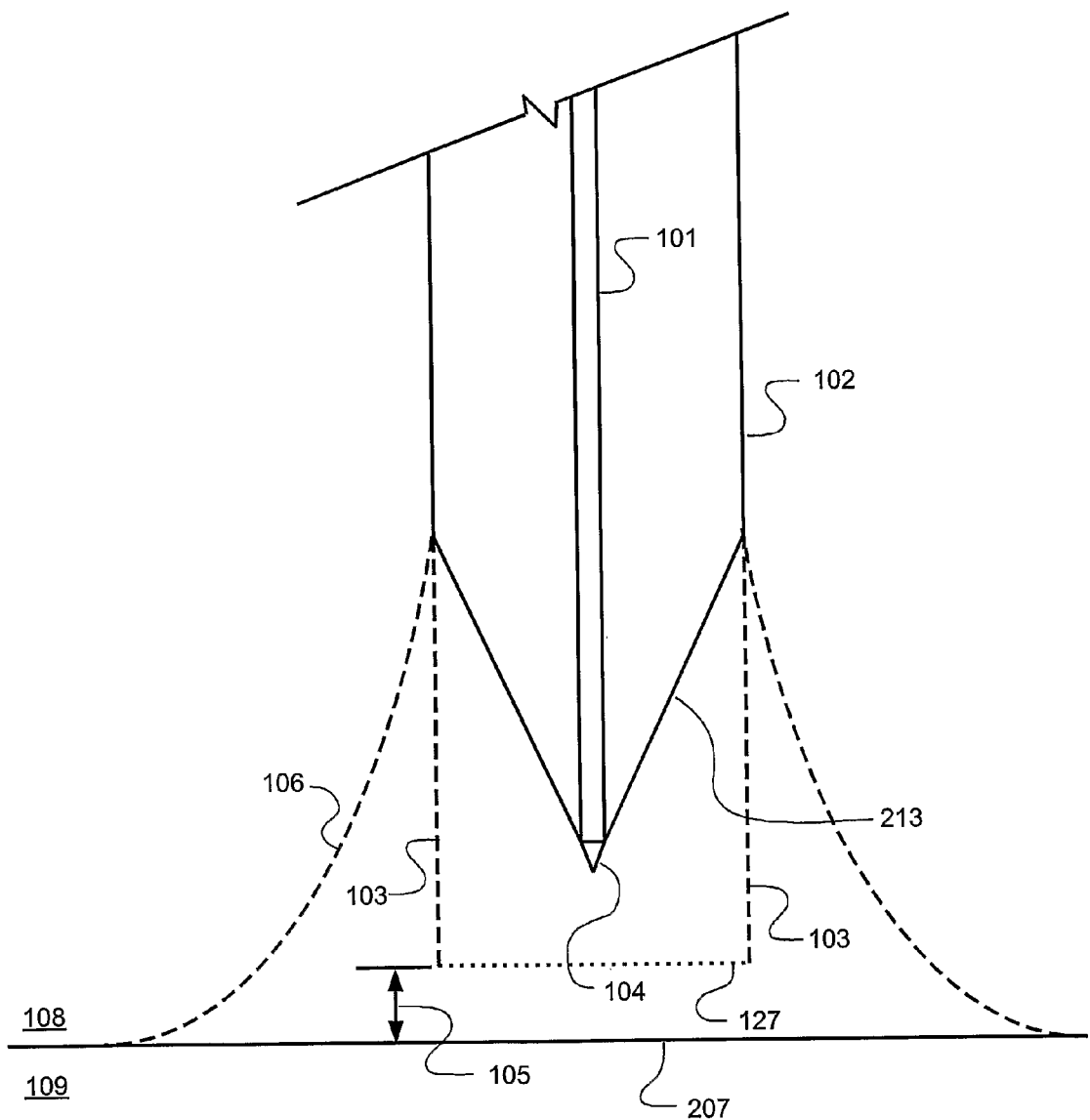
FIG. 2 is a schematic illustration of a completed etching process of an optical fiber to produce a near-field, scanning, optical microscope probe tip in accordance with the present disclosure.

The etching process is allowed to proceed so as to produce the form shown in FIG. 2, where the cladding is etched to a taper designated by reference numeral 213, which meets the tapered surface of the tapered core tip 104. This requires a particular height 105 determined empirically as described below. The initial interface 106 between the enchant 109 and the covering material 108 changes as described earlier and eventually disengages from the fiber 110 forming a flat surface designated by reference numeral 207.

At this point the fiber 110 may be removed from the etching area, and cleaned if necessary. For use as an NSOM probe tip, the etched region of fiber 110 may be coated with a material for increasing the portion of a wave propagating within the core 101 as compared to the portion of the wave traveling outside the core 101. As an example, the tapered core tip and tapered cladding region 104, 213 may be sputter coated with aluminum to form an aluminum thickness of 30 to 100 nm around tapered regions 104, 213. If necessary for sufficient transmitted intensity, a focused ion beam may be used to remove aluminum from the tapered core tip 104 to form the NSOM aperture as described by Saeed Pilevar et al.

Figure 3:
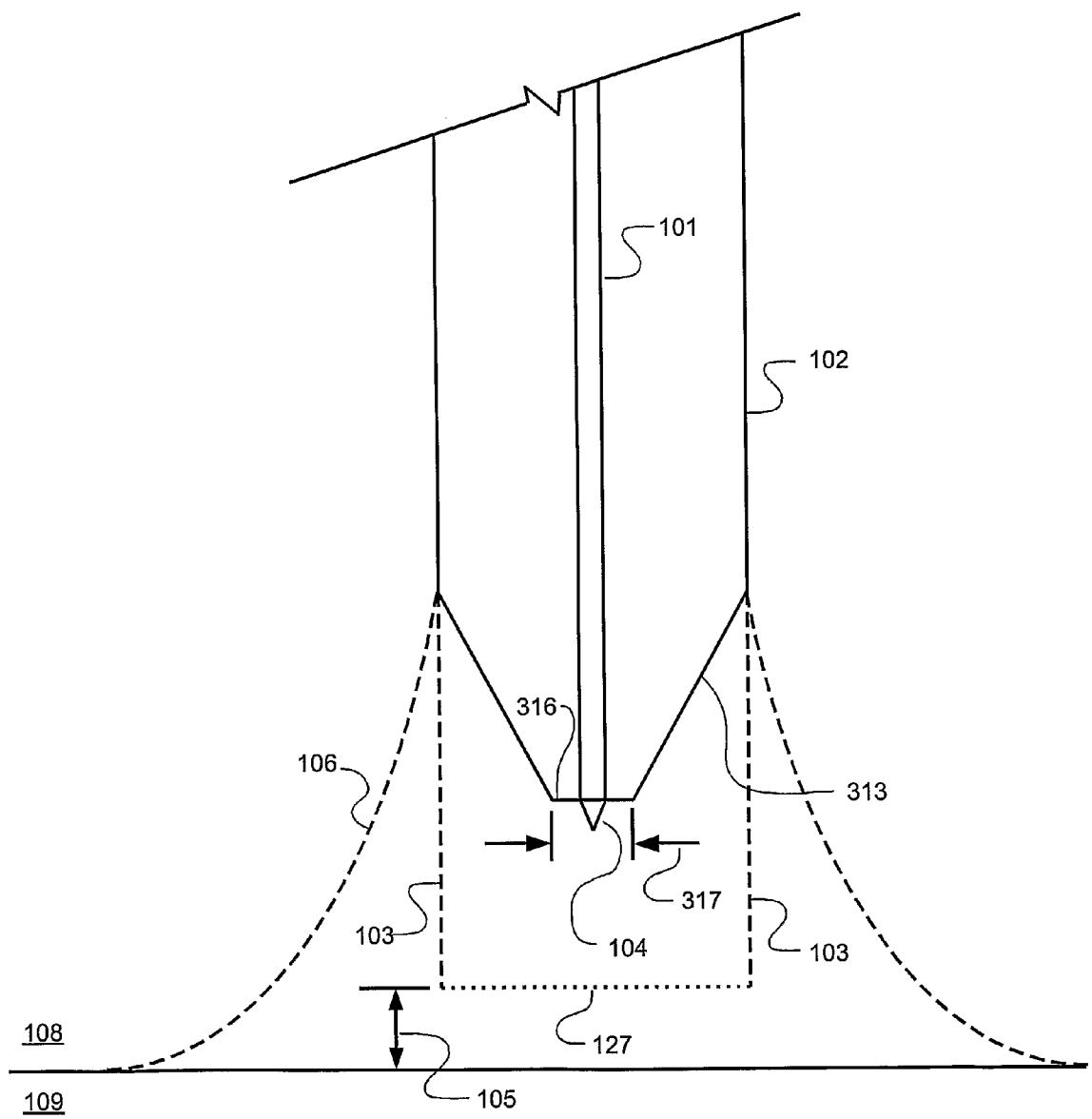
FIG. 3 is a schematic illustration of an interrupted etching process of an optical fiber to produce a near-field, scanning, optical microscope probe tip in accordance with the present disclosure.

Alternatively, as shown in FIG. 3, the etching may be interrupted before the tapered cladding surface designated by reference numeral 313 meets the surface of the tapered core tip 104 resulting in a shoulder 316. The interruption may cause the tapered core tip 104 in FIG. 3 to have a different profile than the tapered core tip 104 in FIG. 2. The interruption may be effected by adjusting the particular height 105 of the immersion. The particular height is shown measured from the initial height of the etching solution to the initial end surface 127 of the fiber 110. Determining and adjusting this height 105 may be accomplished using the apparatus of FIG. 4, which shows the fiber 110 secured to a vertically translating assembly or stage 418 which is actuated by a micrometer adjuster assembly 419. The micrometer adjuster assembly 419 may include a motor, such as a stepping or roto-motor, or other mechanism, for controlling vertical translation or movement of the fiber 110. A suitable vertically translating stage, which can be purchased with a micrometer adjusting head, is available as model NF5DPD20/M from Thorlabs, Inc. Alternatively, any means for controlling the vertical translation of the fiber 110 preferably to an accuracy of 5 microns or less may be used including, for example, a stepper motor and controller also available from Thorlabs, Inc.

Figure 4:
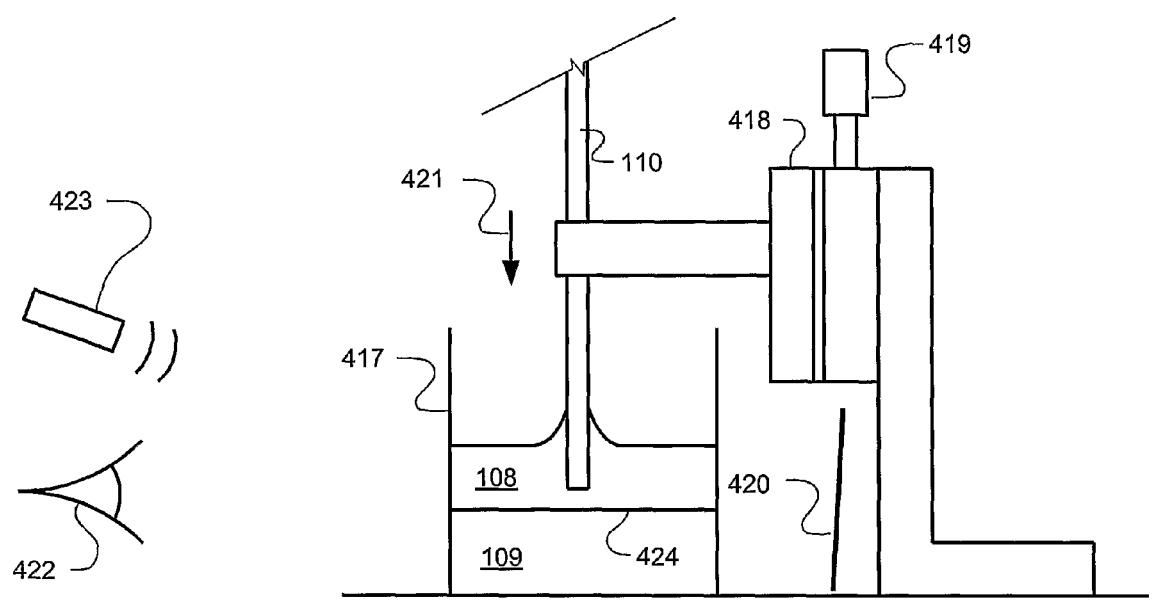
FIG. 4 is a schematic illustration of an apparatus useful for setting the particular height of a fiber with respect to the initial etching solution interface level.
Figure 5:
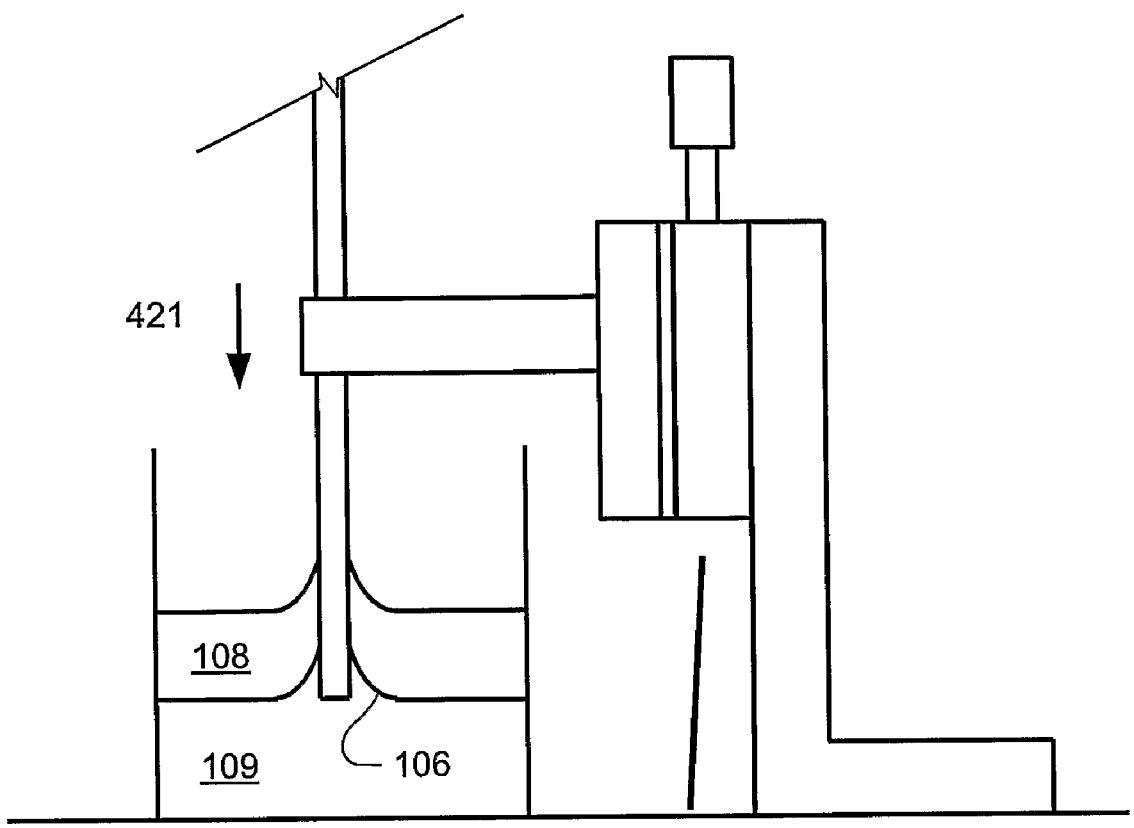
FIG. 5 is a schematic illustration of the apparatus shown in FIG. 4 showing the etching solution having formed a meniscus around the fiber in accordance with the present disclosure.

The process involves first lowering the fiber 110 into the etching solution container designated 417 until it contacts cover material 108 if different than air. Next, the micrometer adjuster assembly 419 is adjusted to move the fiber 110 further in the direction of the arrow 421 while observing the interface 424. A suitable position for observing the interface 424 is the position where an eye 422 is shown in FIG. 4; assuming proper safety precautions are taken to protect from possible etching solution spillage. If necessary, many means can aid in viewing the interface including: additional lighting by, for example, a flashlight 423, a light-colored screen 420, or a microscope (not shown). Upon contacting the interface 424, the etching solution rises and forms a meniscus 106, which envelopes the end of the optical fiber 110 as shown in FIG. 5. Finally, the fiber 110 may be adjusted either up or down from this initial interface contact point.

Figure 6:
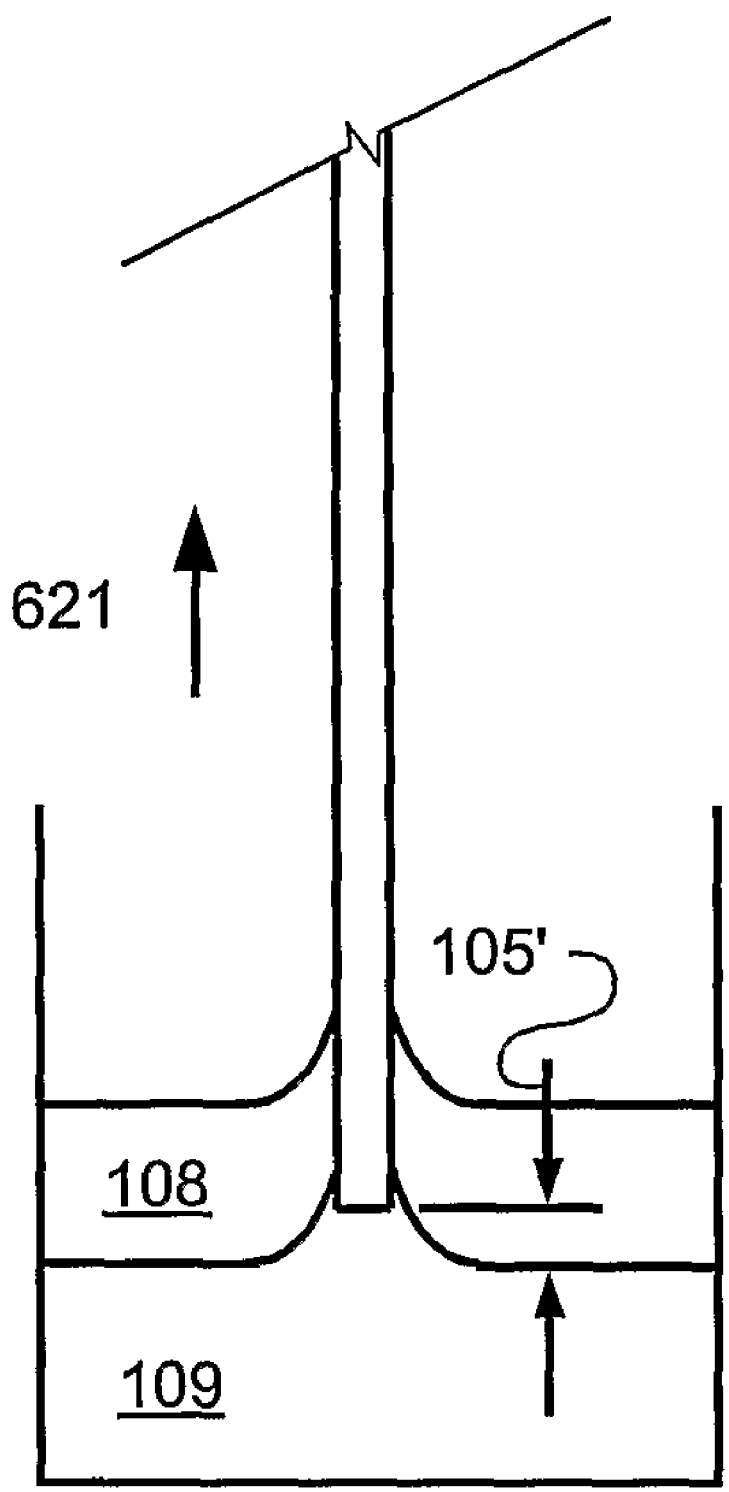
FIG. 6 is a schematic illustration of the adjustment of the particular height of a fiber with respect to the initial etching solution interface level in accordance with the present disclosure.

FIG. 6 illustrates an adjustment upward designated by arrow 621. For E Core™ PM fiber available from KVH Industries, Inc. of Middletown, R.I., USA, by raising the fiber to a height 105' equal to on or about 25 microns results in a fiber having a shoulder 316 (see FIG. 3) with a diameter 317, of about 10 microns. The height can be adjusted up, to form a larger shoulder 316, or down, to form a smaller shoulder 316 or no shoulder 316 at all. Once the particular height 105 or 105' has been determined to form the desired tip shape for a particular fiber it may be used for subsequent etching of the same fiber or for fiber of the same composition and core and cladding diameters. A fiber end formed with a shoulder 316 can be re-immersed in etching solution to reduce the shoulder diameter 317 if desired.

Note that for etching volumes with a surface area greater than 50 times the cross-sectional area of the fiber 110, the level of the etching solution will not change significantly as the fiber 110 is lowered into the etch. Also, if a cover material such as isooctane is used, then the level of the etching solution due to evaporation will be essentially eliminated. If these prescriptions are not followed and the level of the etching solution subsequently changes, then the fiber height should be adjusted accordingly. As another consideration, the etching solution apparatus should be isolated from vibrations which could cause the interface to prematurely disengage from the fiber end. Vibration isolation may be achieved by locating the etching solution apparatus and fiber on an optical table with pneumatic vibration isolation; such an optical table is available from Newport Corporation of Irvine, Calif., USA.

Figure 7:
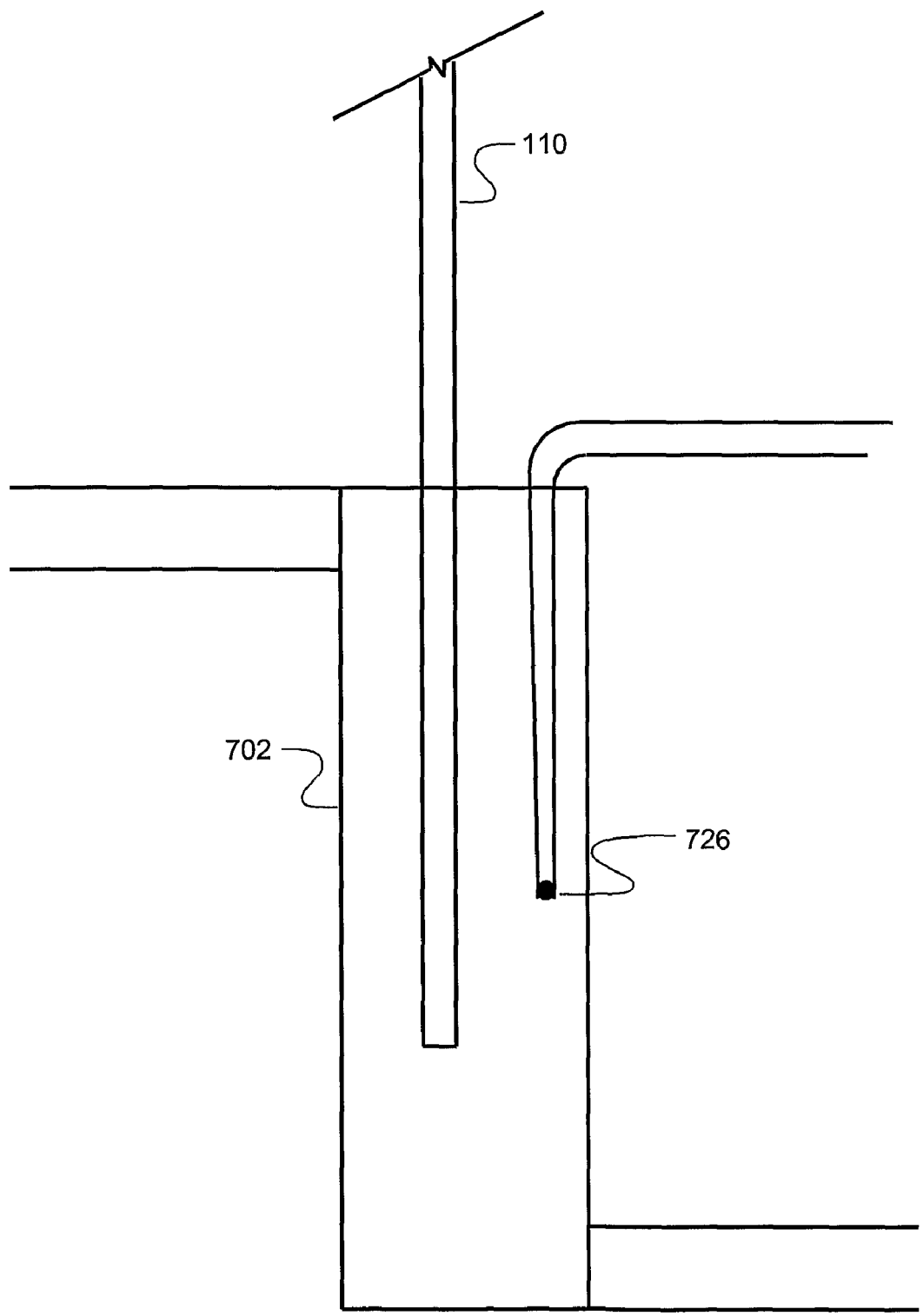
FIG. 7 is a schematic illustration of an optical fiber in a heater assembly configured to cause diffusion of the doping material in accordance with the present disclosure.

The E Core™ PM fiber possesses a manufacturing artifact: an underdoped region of about 50 nm diameter in the center of the core, which is itself doped with germanium. Even though this artifact does not significantly affect the optical transmission properties of the fiber 110, it does cause a deep and narrow crater to form in the center of the tip during the chemical etching process. To eliminate this crater formation, the plastic jacket may be removed from the distal end which then may be placed into a furnace and heated to cause the germanium to diffuse into the underdoped region. FIG. 7 depicts one such furnace system. It consists of a molybdenum boat 702, available as S19C-TA from R. D. Mathis of Long Beach, Calif., USA, which serves as a furnace. The boat 702 is located in a vacuum chamber such as those used for thermal vacuum deposition. The fiber 110 is suspended inside the boat 702 vertically to prevent bending.

The boat 702 is heated at a temperature of approximately 1650 C for approximately two minutes. The temperature may be measured by a platinum rhodium thermocouple junction 726 available from Omega Engineering, Inc. of Stamford, Conn., USA. After heating, the etching process can begin to etch the fiber 110. The heating time and temperature may vary due to the exact configuration and location of the components and may be determined empirically by examining scanning electron images of tips which have been heated and then etched.

The diffusion heating may be adjusted to cause diffusion of the doping material between the core and cladding. This will cause broader core tapers in the etching process. The distal end of the optical fiber 110 may be cleaved before and/or after the heating process to remove contamination which might interfere with the etching process.

Figure 8:
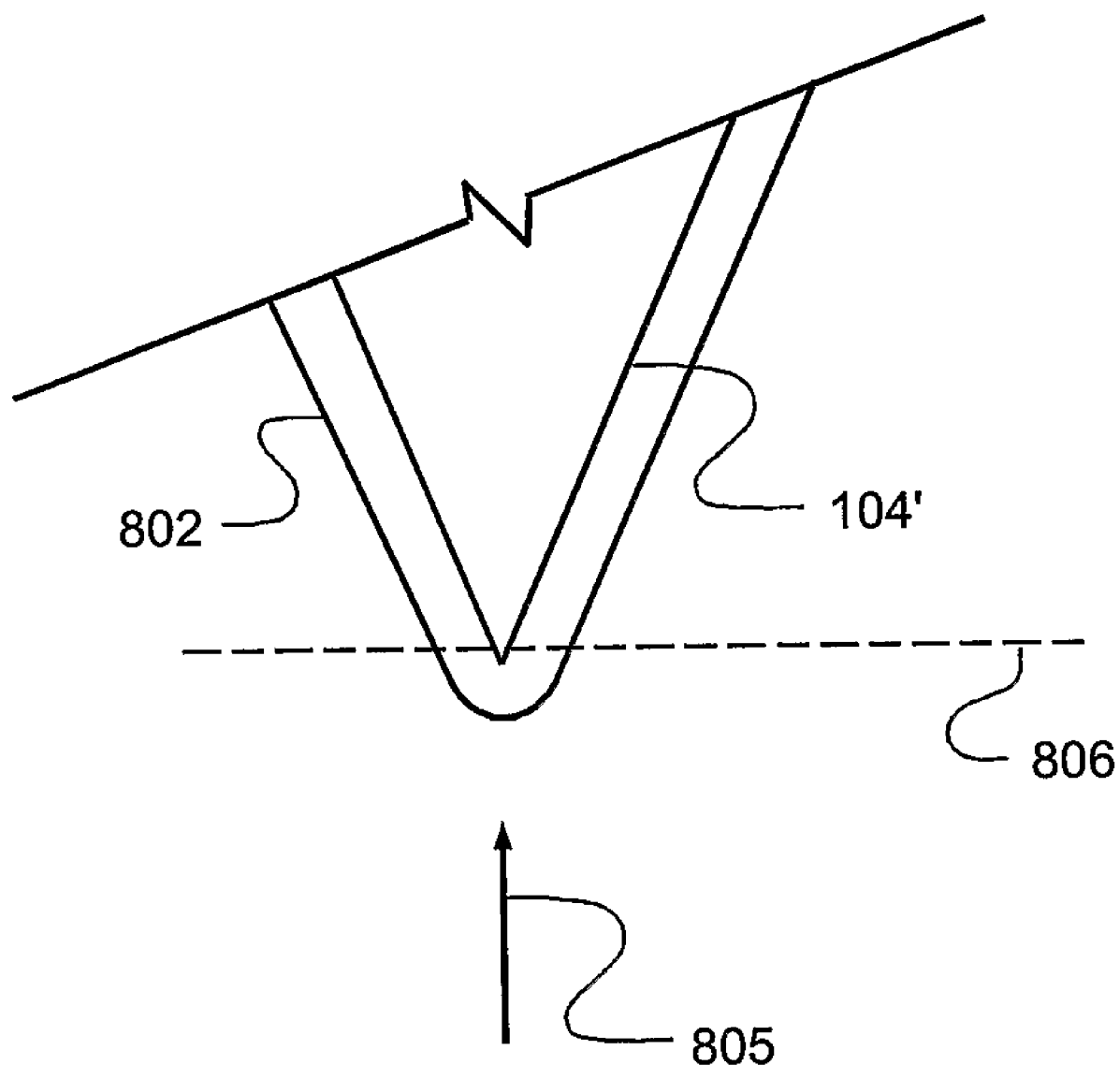
FIG. 8 is a schematic illustration of a tapered core tip of an optical fiber probe tip coated in accordance with the present disclosure.
Figure 9:
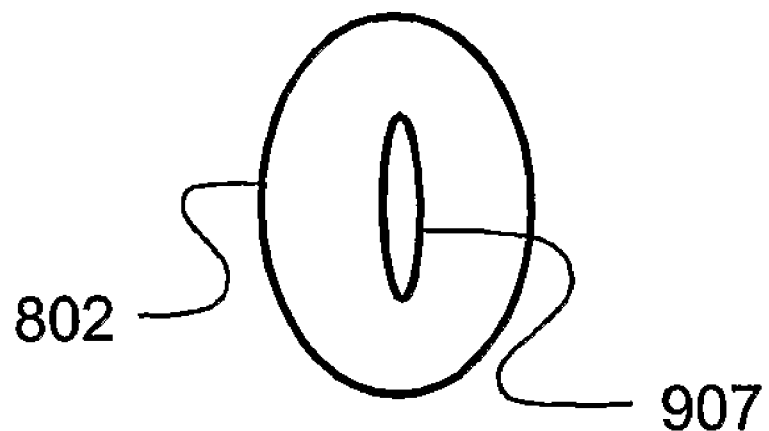
FIG. 9 is a schematic illustration of the end view of the tapered core tip of FIG. 8 in which the optical fiber has an elliptical core and the tip has been sliced by a focused ion bean in accordance with the present disclosure.

The E Core™ PM fiber also possesses an elliptical core which splits the degeneracy and therefore the coupling of the two plane polarization modes as explained by R. Dyott, Elliptical Fiber Waveguides (Artech House, Boston, 1995). Applying the etching method described herein to this fiber results in a tapered core tip which is elliptical in cross-section, having major and minor axes whose orientation corresponds to that of the original core. FIG. 8 illustrates such an elliptical core tip 104', which has been coated with a material, for example, an aluminum coating, which forms a film 802. Slicing away the very tip along a plane surface represented by the dashed line 806 using a focused ion beam so as to expose the glass of the elliptical core, results in a probe with an elliptical aperture 907 as shown in FIG. 9, which is an end view of the fiber of FIG. 8 viewed in the direction of arrow 805. The throughput of the probes depends on the incident polarization. For polarization with the electric field parallel to the minor axis, the tip presents an insertion loss of only 20 dB for apertures with lengths of about 200 nm and widths of 55 nm. Further, the output remains polarized with an extinction ration of 1:100. For input polarization with the electric field parallel to the major axis the tip insertion loss is around 40 dB.

It will be appreciated by those skilled in the art having the benefit of this disclosure that the disclosure provides tapered fiber probe tips suitable for use in NSOM and methods for fabricating the tapered fiber probe tips. It should be understood that the drawings and detailed description herein are to be regarded in an illustrative rather than a restrictive manner, and are not intended to limit the inventive aspects of the embodiments disclosed to the particular forms and examples disclosed. Thus, it is intended that the following claims be interpreted to embrace further modifications, changes, rearrangements, substitutions, alternatives, design choices and embodiments apparent to those of ordinary skill in the art.

What is claimed is:

1. A method for fabricating an optical fiber probe tip using an optical fiber having a cladding and a core, the method comprising:
   immersing a distal end including an initial end surface of the optical fiber into an etching solution in accordance with a predetermined height, wherein the predetermined height is measured from the initial end surface of the optical fiber to an interface between the etching solution and another solution placed over the etching solution; and
   simultaneously etching the cladding and the core using the etching solution for tapering the cladding and the core to form a tapered cladding and a tapered core tip.

2. The method of claim 1, further comprising coating the tapered cladding and tapered core tip with a coating for increasing propagation of a portion of a wave traveling inside the core as compared to a portion of the wave traveling outside the core.

3. The method of claim 2, wherein the coating is aluminum for creating an aluminum coated optical fiber probe tip.

4. The method of claim 3, further comprising removing the aluminum coating from the tapered core tip by an ion beam to form a near-field, optical scanning microscopy aperture.

5. The method of claim 4, wherein the aperture is an elliptical aperture.

6. The method of claim 1, further comprising securing the optical fiber to a vertically translating assembly in operative communication with a micrometer adjuster assembly for vertically translating the optical fiber during the immersing step.

7. The method of claim 6, wherein the immersing step comprises actuating the micrometer adjuster assembly for vertically translating the optical fiber in a first vertical direction for immersing the distal end of the optical fiber into the material.

8. The method of claim 7, wherein the immersing step further comprises continuing immersion of the optical fiber into the material for immersing the distal end in accordance with the predetermined height and for enabling the distal end of the optical fiber to contact the interface, such that the etching solution forms a meniscus enveloping the distal end of the optical fiber.

9. The method of claim 8, further comprising translating the optical fiber in a second vertical direction, opposite the first vertical direction, for creating a shoulder between the tapered cladding and the tapered core tip.

10. The method of claim 9, wherein the diameter of the shoulder depends on a distance between a top surface of the etching solution and the distal end of the optical fiber.

11. The method of claim 1, further comprising heating the distal end of the optical fiber prior to the immersing step.

12. The method of claim 11, wherein the distal end of the optical fiber is heated at a temperature of approximately 1650 C for approximately two minutes.

13. The method of claim 1, further comprising cleaving the distal end of the optical fiber prior to the immersing step.

14. The method of claim 1, wherein the etching solution forms a meniscus enveloping the distal end of the optical fiber for tapering the cladding to form the tapered cladding, and wherein the etching solution tapers the core at a slower rate than the tapering of the cladding.

15. The method of claim 1, wherein the optical fiber is an E Core™ PM fiber.

16. An optical fiber probe tip comprising a tapered cladding and a tapered core tip fabricated by immersing a distal end including an initial end surface of an optical fiber having a cladding and a core into an etching solution in accordance with a predetermined height, wherein the predetermined height is measured from the initial end surface of the optical fiber to an interface between the etching solution and another solution placed over the etching solution, and simultaneously etching the cladding and the core using the etching solution for tapering the cladding and the core to form the tapered cladding and the tapered core tip.

17. The optical fiber probe tip of claim 16, wherein the tapered core tip includes an elliptical aperture.

18. The optical fiber probe tip of claim 17, wherein the tapered cladding is coated with a coating.

19. The optical fiber probe tip of claim 16, wherein the coating is an aluminum coating.

20. The optical fiber probe tip of claim 17, further comprising a shoulder between the tapered cladding and the tapered core tip.

21. A method for fabricating an optical fiber probe tip using an optical fiber having a cladding and a core, the method comprising:
   heating the distal end of the optical fiber prior to the immersing step;
   immersing a distal end including of the optical fiber into an etching solution in accordance with a predetermined height; and
   simultaneously etching the cladding and the core using the etching solution for tapering the cladding and the core to form a tapered cladding and a tapered core tip.

22. The method of claim 21, wherein the predetermined height is measured from an initial end surface of the optical fiber to an interface between the etching solution and another solution placed over the etching solution.

23. The method of claim 21, wherein the etching solution forms a meniscus enveloping the distal end of the optical fiber for tapering the cladding to form the tapered cladding, and wherein the etching solution tapers the core at a slower rate than the tapering of the cladding.

* * * * *